United States Patent [19]

Bazarnik

[11] 4,404,641
[45] Sep. 13, 1983

[54] MAINTENANCE MONITOR

[75] Inventor: Louis M. Bazarnik, Jericho, N.Y.

[73] Assignee: Dierckx Equipment Corporation, Long Island City, N.Y.

[21] Appl. No.: 234,769

[22] Filed: Feb. 17, 1981

[51] Int. Cl.$^3$ .................. G06F 15/20; G08B 19/00
[52] U.S. Cl. .................. 364/569; 364/424; 377/20; 340/52 D
[58] Field of Search .......... 364/569, 424, 551, 431.01; 235/92 F; 340/52 D; 368/10

[56] References Cited

U.S. PATENT DOCUMENTS

| | | | |
|---|---|---|---|
| 3,758,756 | 9/1973 | Johns | 235/92 MT |
| 3,905,014 | 9/1975 | Doench | 340/52 D |
| 4,025,774 | 5/1977 | Johnson et al. | 364/569 |
| 4,031,363 | 6/1977 | Freeman et al. | 235/92 T X |
| 4,072,850 | 2/1978 | McGlynn | 340/53 D X |
| 4,134,101 | 1/1979 | Jones | 340/52 D |
| 4,135,246 | 1/1979 | McMannis | 364/900 |
| 4,142,238 | 2/1979 | Brandt et al. | 364/569 X |
| 4,159,531 | 6/1979 | McGrath | 340/52 D X |
| 4,168,525 | 9/1979 | Russell | 364/569 |
| 4,218,871 | 8/1980 | Moritani et al. | 235/92 T X |
| 4,271,402 | 6/1981 | Kastura et al. | 340/52 F |
| 4,296,409 | 10/1981 | Whitaker et al. | 364/551 X |

FOREIGN PATENT DOCUMENTS

| | | | |
|---|---|---|---|
| 54-144840 | 11/1979 | Japan | 364/569 |
| 542192 | 4/1977 | U.S.S.R. | 364/569 |

*Primary Examiner*—Edward J. Wise
*Attorney, Agent, or Firm*—Kirschstein, Kirschstein, Ottinger & Cobrin

[57] ABSTRACT

Disclosed is a maintenance monitor which at a preselected interval will automatically alert one that the equipment of concern is due for maintenance. The maintenance monitor includes a control unit sensing device such as a switch inductive pickup etc., a programmable module counter activated by a signal from the sensing device and a display for readout of the counter and to advise of the maintenance period or to perform a function.

7 Claims, 4 Drawing Figures

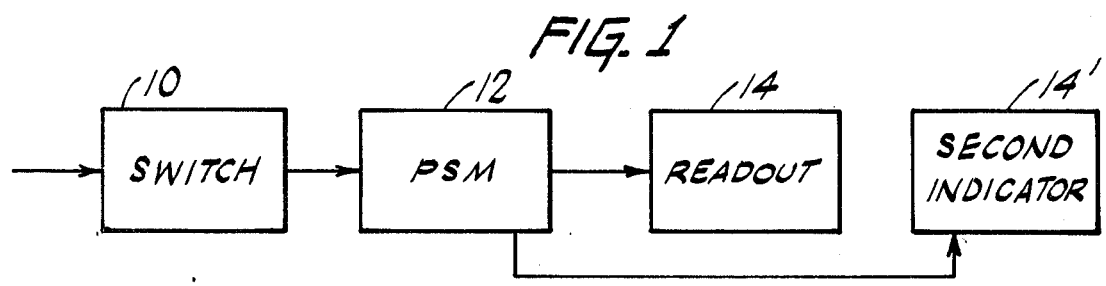
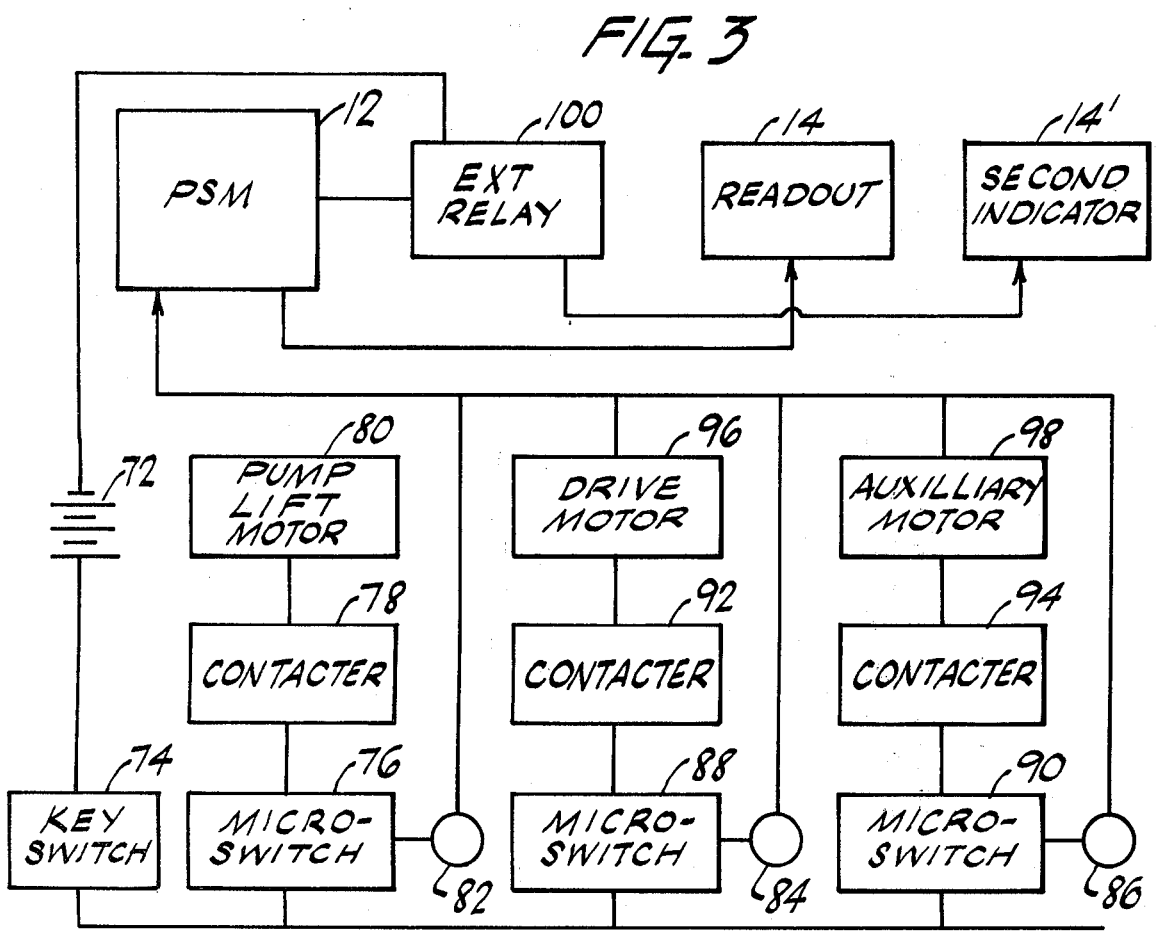

MAINTENANCE MONITOR

BACKGROUND OF THE INVENTION

The present invention is in a maintenance monitor and more specifically in programmable maintenance monitors. The monitor serves to automatically advise that maintenance of equipment should be undertaken.

U.S. Pat. No. 4,025,774 discloses an electronic system employing a calculator as an arithmetic unit and accumulator. Present values of time are entered on a keyboard in the chosen mode of timer or stop clock. Sequencing circuitry gates the output of an oscillator to provide time increment pulses. A visual display indicates accumulated time in both modes. When employed as a timer, an audible signal is produced when a preset time has elapsed. However, this patent offers little by way of practical application of the disclosure thereof.

U.S. Pat. No. 3,758,756 discloses a miniaturized recorder and display device which receives data from operating engine sensors and activates the appropriate indicator to display the same. The device disclosed by this patent is adapted to provide a history of operation and to display present operating conditions and does not provide means for automatic indication of maintenance requirements.

U.S. Pat. No. 4,031,363 discloses a display apparatus for automotive vehicles which, among other things, can advise the operator of when, in miles or in days, service is again to be performed. However, the device is not suitable for indicating actual operating time of the vehicle.

U.S. Pat. No. 4,135,246 discloses an integrated history recorder for a gas turbine engine with numerous output displays indicating engine running time. The underlying motivation for such a measurement is based on the fact that the reliable operational life of such an engine is inversely related to the temperature and duration of temperature at which the gas turbine engine operates. The reference discloses use of a mechanical digital counter to provide an accumulative indication of engine run time.

U.S. Pat. No. 4,159,531 discloses a solid state unit useful in maintenance of a motor vehicle which provides a reminder of the next maintenance mileage point as well as which items are to be serviced. However, the device is equipped with a programmable read only memory capable of storing eight bit data words but has no capacity for accumulation of operational information.

SUMMARY OF THE INVENTION

The present invention is in a maintenance monitor for use in indicational and other types of equipment whereby the operator will be automatically advised, by visual and/or audible means, that the equipment is due for maintenance. Additionally, the monitor may be integrated into the equipment circuitry so as to entirely disable the equipment until such maintenance is performed.

The maintenance monitor includes a sensor such as a switch or inductive pickup, a programmable module counter activated by the sensor or control unit, and two (2) outputs.

The sensor or control unit activates the module counter. The unit can be activated by current. The input to the unit may be controlled by switching apparatus, inductive pickups, magnetic fields and light, sound or heat sensitive devices.

The module counter is a timing module with the capacity to accumulate time and is programmable with at least two set points so that at preset time intervals, the operator will be advised that the warning period has elapsed and finally that the countdown for maintenance has commenced. When the total preset time has elapsed, an indication and/or function occurs.

The readout may be an LCD or LED panel which will be activated when the pre-maintenance warning and maintenance period have elapsed. The readout or output may be in the form of an audible signal informing the operator that maintenance is required or will shortly thereafter be required.

The various features of novelty which characterize the inveniton are pointed with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 1 is a generalized flow diagram of the component parts of the invention;

FIG. 3 shows an arrangement for application of the invention in an electric forklift; and FIG. 4 shows an arrangement for application of the invention in a fossil fueled engine.

DESCRIPTION OF THE PREFERRED EMBODIMENT

Figure 2:
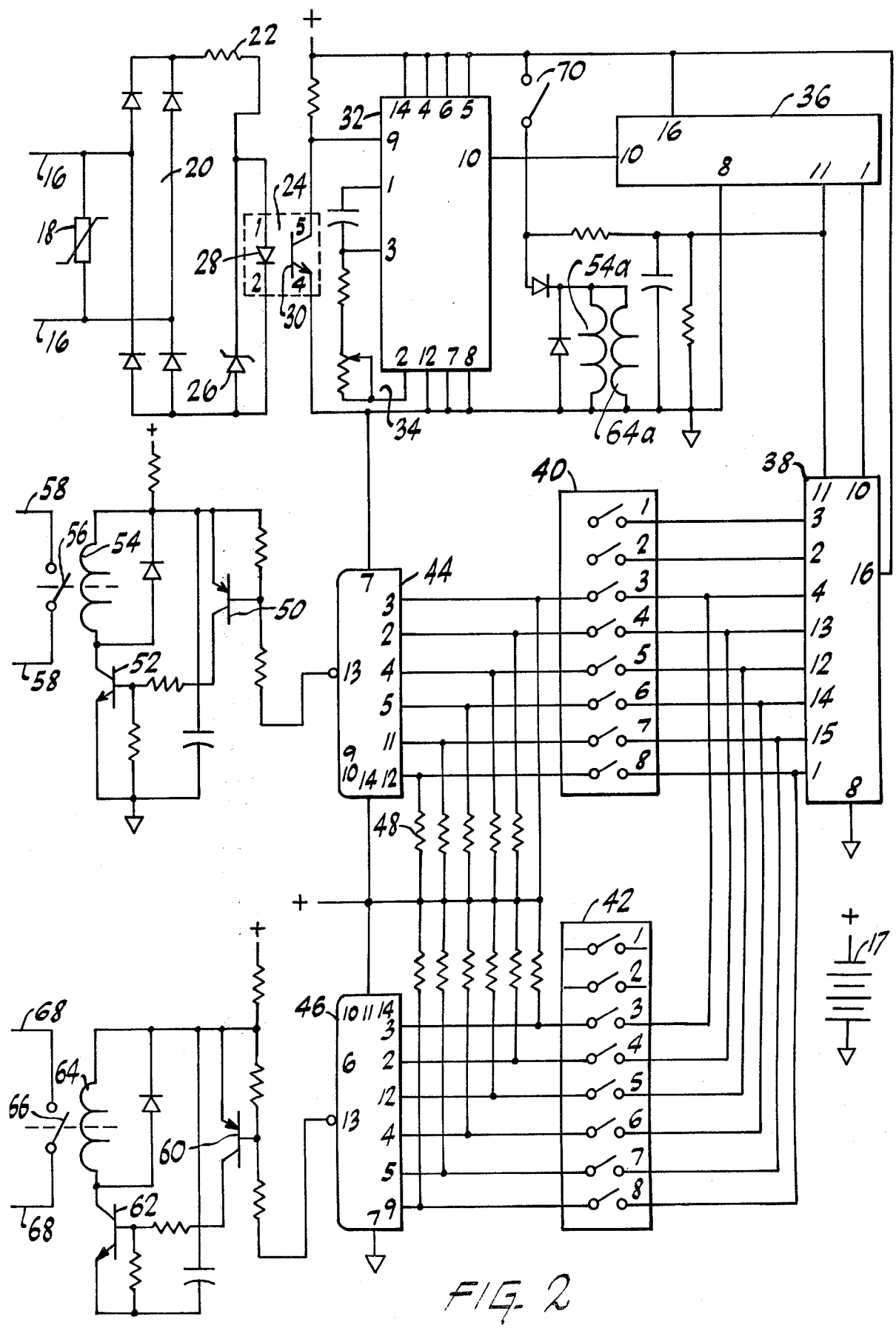
FIG. 2 shows the circuitry of the PSM module depicted in FIG. 1.

Referring to FIG. 1, the maintenance monitor device includes three basic elements. The first of these elements is a means to complete an electrical circuit, such as an activator or switch device 10 which may be of a common variety, which in turn excites a control unit. Various means for activation of the unit are contemplated such as by a thermocouple based on heat energy, decibel readings based on sound energy or photocells based on light energy. However, the preferred method relates to use of electrical characteristics such as current or continuity induced into the control unit. The voltage which activates the control unit may be from a 12–72 V DC non polar source.

Activator 10 completes an electrical circuit to excite the programmed module counter or programmable service module 12, hereinafter PSM, which functions as a programmable switch and which will be subsequently dealt with in detail. The outputs of the PSM unit complete electrical circuitry which activate a readout and/or indicator 14. The exact mode and nature of the interaction between PSM 12 and readout 14 will be described in connection with the description of unit 12. Readout 14 can be a voltage induced unit such as an LCD or LED display and/or a coulomb etched placard. The readout 14 may take the form of an audible signal such as a horn or beeper. Other readout or signal means such as flashing lights or a machine stop mechanism may be employed to advise operators that a critical time period has elapsed or is approaching.

PROGRAMMED SERVICE MODULE

The circuitry of programmed service module 12 (PSM) is generally depicted in FIG. 2. The output from switch 10 in the form of a non polar D.C. voltage signal in the range of 12 to 72 V feeds into PSM 12 along leads 16. The PSM unit has a battery 17 which is preferably a 9 V NiCad rechargeable type. Bridging leads 16 is a varistor 18 to filter out transients or power surges or any signal above 91 volts. The filtered signal along leads 16 enters a bridge circuit 20 known as a full wave bridge circuit which, if necessary, corrects polarity or rectifies current, i.e., AC to DC. The bridge circuit is composed of diodes $D_1$, $D_2$, $D_3$ and $D_4$. Dropping resistor 22 limits the flow of current through the light emitting diode of opto-isolator 24. Zener diode 26 is a 12 V diode utilized for protection purposes.

Current passing through bridge 20 activates light emitting diode (LED) 28 in opto-isolator 24 which transmits light to phototransistor 30. Activation of phototransistor 30 causes pin 9, which is the reset pin of oscillator chip 32, to become activated. Pin 9 is up when there is no signal applied to leads 16. When pin 9 is down, pin 10 is activated to provide a square wave output of 0.055 seconds duration, that is the total duration of an up-down cycle of pin 10 due to RC circuit 34.

The square wave output of pin 10 of oscillator chip 32 feeds into pin 10 of binary counter 36 which is a twelve (12) stage unit, the output of which is in terms of 2 raised to the twelfth power. The output of counter 36 can be arrived at by the simple expression (1) of:

$$2^{12} \times 0.055. \tag{1}$$

The product of (1) is 225 seconds indicating that pin 1 of counter 36 will produce a signal at 225 second intervals, that is to say that pin 1 will be up for 112.5 seconds and down for 112.5 seconds and the transition from the up to down position will signal second binary counter 38.

Second binary counter 38 is also a 12 stage binary counter. Binary counters 36 and 38 are exemplified by CD 4040 by RCA. The first output of counter 38 will be at two hours and the last output of counter 38 will be that of pin 1 at 256 hours. That output signal will travel to first interval switch 40 which is an eight position DIP switch.

Switch 40 is the programmable heart of the PSM 12 in that by selection of the appropriate position from the eight available positions, that selected position in connection with the appropriate pin of counter 38 will determine the interval for further activity within the remainder of the PSM circuit. Second switch 42 also receives the output of counter 38.

NAND gates 44 and 46 receive the output of switches 40 and 42 respectively. When a position in either switch 40 or 42 is open, the input to the corresponding pin of NAND gate 44 or 46 will be zero but when an activated position of switch 40 or 42 is closed, the input in terms of time interval signal to NAND gate 44 or 46 will be whatever is the time interval output of the corresponding pin of counter 38. In function, NAND gate 44 or 46 acts as a retarding mechanism in that each pin 13 will only be activated when all the inputs (3, 2, 4, 5, 11, 12) or (3, 2, 12, 4, 5, 9) are up. So when pin 1 of counter 38 is activated after 256 hours and position 8 of switch 40 is closed, pin 13 of NAND gate 44 will go down (be activated) due to pull up resistors 48. When pin 13 of NAND gate 44 is down, transistor 50 is activated which in turn activates transistor 52. Transistor 52 likewise activates relay 54 closing normally open switch 56 providing a signal to leads 58 as in a latching relay. Leads 58 connect a visual or audible signal in the form of readout 14.

Activation of pin 13 of NAND gate 46 activates transistor 60 which in turn activates transistor 62 which activates relay 64 closing normally open switch 66 allowing a signal to pass along leads 68. This signal will also pass on to readout 14' for a second indication signal. Of course, one of ordinary skill in the art will appreciate that leads 68 may be additionally or separately connected to an entirely separate readout or signal means to provide more than one type of indication to an operator.

The above described unit may be reset by manual activation of switch 70 which in turn energizes coils 54a and 64a which in turn reopen switches 56 and 66 respectively thus resetting the latching relays. Simultaneously, in accordance with the schematic, the time function of binary counters 36 and 38 are reset to zero.

FIG. 3 generally shows in diagrammatic form how the described maintenance monitor may be used in connection with an electric forklift device commonly employed in numerous industries.

The forklift device is electric in nature and is powered by a 12-72 DCV battery 72 which energizes the circuit when ignition switch 74, which is preferably a SPST switch, is manually activated and brings various other aspects of the circuitry into an active state. Thus, when microswitch 76, which is of the push button variety, is engaged, contacter 78 is energized. Contacter 78 is of the variety that may be purchased from Hartman or Square D Company. Contacter 78 activates lift pump motor 80 which is used for elevating the carriage of the forklift. Diodes 82, 84 and 86 isolate the particular portions of the circuit that are to be activated. So, when microswitch 76 is activated, the PSM unit is engaged in that leads 16 (FIG. 2) of PSM unit 12 receive an input and will start the sequence of events previously described. Likewise, when microswitch units 88 and 90 are engaged, contacters 92 and 94 respectively activate drive motor 96 and auxilliary motor 98 respectively and provide input to PSM unit 12. The drive motor 96 actually drives the forklift while the auxilliary motor 98 is used for other truck functions such as tilting, projecting the carriage and power steering.

When the second preset period of time has elapsed, relay 64 will close switch 66. This output of PSM unit 12 will feed into an external non-latching relay 100 with suitable characteristics compatible with the circuit power source. The external relay 100 is preferably of the DPDT variety and is well known to those of ordinary skill in the art. One terminal of external relay 100 is connected with switch 74. A normally closed switch (not shown) in external relay 100 is opened by the signal thus cutting out the pump lift motor circuit thus disabling the truck's lifting function. Simultaneously, a second switch (not shown), which is normally opened, is closed thus activing second indicator 14'. It will be appreciated that additional normally closed relays could be added to disable other truck functions.

FIG. 4 generally depicts an alternate embodiment whereby the arrangement may be employed in connection with gas or diesel powered forklifts or other so powered devices. As described with reference to the embodiment of FIG. 3, after the second time parameter set point is reached in PSM unit 12, external relay 100 is activated due to the closing of switch 66. This causes a normally closed switch (not shown) in relay 100 to open thus cutting out solenoid 102. In this instance, the motor will continue to run. However, once the motor is shut off, it will not be restarted since started motor 104 is no longer in the live circuit due to the break via solenoid 102. Additionally, as was true of the arrangement depicted in FIG. 3, the closing of switch 66 will, via a second switch (not shown) in relay 100 activate second indicator 14'.

PSM unit 12 is normally engaged in operation of the unit when the engine is running by the closing of a normally opened vacuum switch 106 which is activated by motor induced vacuum. Normally open vacuum switch 106 completes a circuit from the ignition switch (SDST) 108 and starter button 110 via solenoid 102 and starter motor 104 which provides an input to leads 16 (FIG. 2) of PSM unit 12.

The terms and expressions which have been employed are used as terms of description and not of limitations, and there is no intention in the use of such terms and expressions of excluding any equivalents of the features shown and described or portions thereof, it being recognized that various modifications are possible within the scope of the invention.

I claim:

1. A running-time maintenance monitor for indicating when equipment to be operated is due for maintenance, said monitor comprising:
   (a) user-settable means for manually setting a predetermined maintenance time indicative of when the equipment being operated is due for maintenance;
   (b) running time sensor means for detecting only the running time of the equipment each time the latter is operated;
   (c) control means responsive to the running time sensor means, and operative for accumulating each running time, and for generating a control signal when the accumulated running time corresponds to the predetermined maintenance time set by the user; and
   (d) indicator means responsive to generation of the control signal, and operative for indicating when the equipment is due for maintenance.

2. The monitor as defined in claim 1, wherein the user-settable means is also operative for manually setting a predetermined pre-maintenance time indicative of an advance indication of when the equipment is due for maintenance.

3. The monitor as defined in claim 2, wherein the indicator means includes a first readout when the accumulated running time corresponds to the predetermined maintenance time, and a second readout when the accumulated running time corresponds to the predetermined pre-maintenance time.

4. The monitor as defined in claim 1, wherein the running time sensor means includes means for detecting the beginning and the end of each running time.

5. The monitor as defined in claim 4, wherein the control means includes a counter operative to begin counting upon the detection of the beginning of each running time, and to cease counting upon the detection of the end of each running time.

6. The monitor as defined in claim 1, wherein the control means includes means for disabling the equipment upon generation of the control signal.

7. The monitor as defined in claim 1, wherein the control means also includes reset means for restarting the accumulated running time from zero.

* * * * *